(12) United States Patent
Balaji et al.

(10) Patent No.: US 8,871,390 B2
(45) Date of Patent: Oct. 28, 2014

(54) PAN-PEO GELS WITH IMPROVED CONDUCTANCE AND SOLVENT RETENTION

(75) Inventors: Ramamurthy Balaji, Coimbatore (IN); Ajit R. Kulkarni, Mumbai (IN); Raman S. Srinivasa, Mumbai (IN)

(73) Assignee: Indian Institute of Technology Bombay, Powai, Mumbai, Maharashtra (IN)

( * ) Notice: Subject to any disclaimer, the term of this patent is extended or adjusted under 35 U.S.C. 154(b) by 59 days.

(21) Appl. No.: 13/139,114

(22) PCT Filed: Aug. 27, 2010

(86) PCT No.: PCT/IB2010/002105
§ 371 (c)(1),
(2), (4) Date: Jun. 10, 2011

(87) PCT Pub. No.: WO2011/154766
PCT Pub. Date: Dec. 15, 2011

(65) Prior Publication Data
US 2012/0058398 A1    Mar. 8, 2012

(30) Foreign Application Priority Data
Jun. 8, 2010   (IN) .................. 1751/MUM/2010

(51) Int. Cl.
  *H01M 6/14*   (2006.01)
  *H01M 6/16*   (2006.01)
  *H01M 10/0565*  (2010.01)

(52) U.S. Cl.
  CPC .. *H01M 10/0565* (2013.01); *H01M 2300/0085* (2013.01); *Y02E 60/12* (2013.01); *H01M 6/162* (2013.01)
  USPC ........... 429/303; 429/300; 429/330; 429/337; 429/338

(58) Field of Classification Search
  CPC .................................. H01M 10/0565
  USPC .................................. 429/303, 330
  See application file for complete search history.

(56) References Cited

U.S. PATENT DOCUMENTS

| 5,658,686 | A | * | 8/1997 | Akashi ..................... | 429/303 |
| 5,925,283 | A | * | 7/1999 | Taniuchi et al. ........... | 252/62.2 |
| 2003/0138693 | A1 | * | 7/2003 | Suzuki et al. ............... | 429/162 |
| 2005/0130035 | A1 | * | 6/2005 | Inada et al. ................ | 429/161 |
| 2005/0227144 | A1 | * | 10/2005 | Akashi et al. ............. | 429/209 |
| 2010/0129721 | A1 | | 5/2010 | Xu et al. | |

FOREIGN PATENT DOCUMENTS

| CN | 101714659 | 5/2010 |
| KR | 20100035870 | 4/2010 |

OTHER PUBLICATIONS

Abbrent, S., et al., "Crystallinity and morphology of PVdF-HFP-based gel electrolytes," Polymer 42 (2001) 1407-1416.
Addonizio, M.L., et al., "Study of the non-isothermal crystallization of poly(ethylene oxide)/poly(methyl methacrylate) blends," Polymer, vol. 28, Issue 2, Feb. 1987, pp. 183-188.
Balaji, R., "Synthesis and Electrical Properties of Gel Polymer Electrolytes," Ph.D. Thesis, IiT Bombay, 2008.
Bashir, Z., et al., "The formation of polymer-solvent complexes of polyacrylonitrile from organic solvents containing carbonyl groups," Acta polymer., 44, 211-218 (1993).
Chintapalli, S., et al. "Effect of plasticizers on high molecular weight PEO-LiCF3SO3 complexes," (1996) Solid State Ionics, 86-88 (Part 1), pp. 341-346.
Choi, B.K., et al., "Ionic conduction in PEO-PAN blend polymer electrolytes," Electrochimica Acta 45 (2000) 1371-1374.
Choi, B.K., et al., "Lithium ion conduction in PEO—salt electrolytes gelled with PAN," Solid State Ionics, 1998, 113-115, 123.
Deepa, M., et al., "Ion-pairing effects and ion—solvent—polymer interactions in LiN(CF3SO2)2—PC—PMMA electrolytes: a FTIR study," Electrochimica Acta, vol. 49, Issue 3, Jan. 30, 2004, pp. 373-383.
Durig, J.R., et al., "Far-infrared spectra and structure of small ring compounds. Ethylene carbonate, γ-butyrolactone, and cyclopentanone," Journal of Molecular Spectroscopy, vol. 27, Issues 1-4, Sep. 18, 1968, pp. 285-295.
Durig, J.R., et al., "Vibrational spectra and structure of small ring compounds: XVII. Far infrared and matrix spectra of vinylene carbonate," Journal of Molecular Structure, vol. 5, Issues 1-2, Feb. 1970, pp. 67-84.
Fortunato, B., et al., "Infrared and Raman spectra and vibrational assignment of ethylene carbonate," Spectrochimica Acta Part A: Molecular Spectroscopy, vol. 27, Issue 9, Sep. 1971, pp. 1917-1927.
Hayamzu, K., et al., "Diffusion, conductivity and DSC studies of a polymer gel electrolyte composed of coss-linked PEO, γ-butyrolacone LiBF4," Solid State Ionics 107 (1998) 1-2.
Yoshimoto, N., et al., "Ionic conductance of gel electrolyte using a polyurethane matrix for rechargeable lithium batteries," Electrochimica Acta 50 (2004) 275-279.
Rajendran, S., et al., "Experimental investigations on PAN-PEO hybrid polymer electrolytes," Solid State Ionics 130 (2000) 143-148.
Song, J. Y., et al., "Review of gel-type polymer electrolytes for lithium-ion batteries," Journal of Power Sources, vol. 77, No. 2, Feb. 1999 , pp. 183-197(15).
Wang, J., et al., "Ion-molecule interactions in solutions of lithium perchlorate in propylene carbonate + diethyl carbonate mixtures: an IR and molecular orbital study", Spectrochimica Acta Part A, 58 (2002) 2097-2104.
Wang, Z., "Infrared spectroscopic study of the interaction between lithium salt LiClO4 and the plasticizer ethylene carbonate in the polyacrylonitrile-based electrolyte," Solid State Ionics, vol. 85, Issues 1-4, May 1996, pp. 143-148.

(Continued)

*Primary Examiner* — Barbara Gilliam
*Assistant Examiner* — Robert S Carrico
(74) *Attorney, Agent, or Firm* — Moritt Hock & Hamroff LLP; Steven S. Rubin, Esq.

(57) ABSTRACT

Disclosed are gel electrolytes comprising a polymer, which is polyacrylonitrile (PAN) and polyethylene oxide (PEO); a lithium salt; and a solvent, which is a carbonate solvent, a lactone solvent, or mixtures thereof.

1 Claim, 1 Drawing Sheet

(56) References Cited

OTHER PUBLICATIONS

International Search Report and Written Opinion prepared by the Australian Patent Office for PCT/IB2010/002105 completed Nov. 25, 2010.

Privalko, V.P., et al., "Miscible polymer blends: 1. Thermodynamics of the blend melts poly(methyl methacrylate)-poly(ethylene oxide) and poly(methyl methacrylate)-poly(vinylidene flouride)," Polymer, vol. 31, Issue 7, Jul. 1990, pp. 1277-1282.

\* cited by examiner

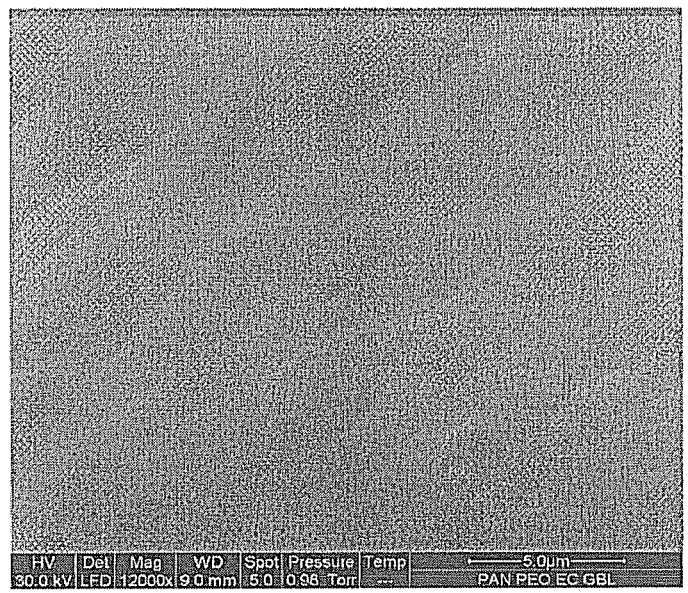

PAN-PEO GELS WITH IMPROVED CONDUCTANCE AND SOLVENT RETENTION

CROSS REFERENCE TO RELATED APPLICATION

The present application claims priority to a corresponding patent application filed in India and having application number 1751/MUM/2010, filed on Jun. 8, 2010, the entire contents of which are herein incorporated by reference. The present application is a U.S. National Phase Application pursuant to 35 U.S.C. 371 of International Application No. PCT/IB2010/002105, filed on Aug. 27, 2010, the entire contents of which are herein incorporated by reference.

BACKGROUND

A battery is a device that converts chemical energy into electrical energy by means of an electrochemical reaction. With the ever-increasing market for portable electronic devices, such as cell-phones, laptop computers, there is also an increased need for improved energy sources. Most of the electronic products today use "state-of-the-art" batteries, and yet the performance of these leaves much to be desired. Another aspect is the environmental threat posed by the heavy metals used in many of today's batteries. As society is becoming more aware of these problems, the desire for environmentally friendly battery components is growing.

Many of the electrical devices that consumers demand are limited by their power source. From electric vehicles to cellular phones, advances in battery technology have not kept pace with the power requirements of electrical devices. Lithium metal batteries have been targeted as the next generation power sources for these devices, since lithium has the most electropositive potential (−3.04 V versus standard hydrogen electrode), lowest equivalent weight (6.94 g/mol), lowest specific gravity (0.53 g/cm$^3$) and highest mass ratio. These properties facilitate the design of storage systems with higher energy density compared with other battery systems.

A battery includes at least three main components: cathode, electrolyte and anode. The cathode is the electrode where a reduction reaction occurs, whereas the anode is the electrode where an oxidation reaction occurs. The electrolyte is an electronic insulator and a good ionic conductor. One of the electrolyte's main functions is to provide a transport medium from one electrode to the other. Although significant progress has been made in the development of batteries, several factors, such as the electrolyte, have limited their commercial use.

Electrolytes should be chemically and electrochemically stable, mechanically strong, safe and inexpensive. Liquid electrolytes facilitate high-ionic mobility. However, due to safety concerns involving leakage and flammability, the use of liquid electrolytes in lithium battery systems has often been deterred. While solid electrolytes, such as ceramic and polymer electrolyte, prevent the formation of vapor-pressure and leakage problems, ionic transport within these materials is often too slow for typical battery applications. Ideally, an electrolyte would have the electrical properties of a liquid and the mechanical properties of a solid. Such an electrolyte would serve both as electrolyte and separator, and would provide the battery with mechanical flexibility, a property unattainable in cells with conventional liquid electrolytes.

Gel electrolytes possess both the cohesive properties of solids and the diffusive transport properties of liquids. This duality enables the gel to find a variety of applications. Gels can be obtained as a result of either a chemical or a physical linking process. The use of substantial amounts of plasticizers in gel electrolyte gave rise to problems such as but not limited to loss of mechanical strength, and exudation of solvent, which subsequently lead to thermal, chemical and electrochemical instability.

Polyacrylonitrile (PAN) based gel electrolyte is a widely investigated system. Its structure swells and allows high solvent intake (~80 wt %). High solvent intake is desirable as it leads to high ionic conductivity. The conductivity of PAN gel electrolyte was expected to be close to that of the corresponding liquid electrolyte, but it was found to be an order of magnitude less than the conductivity of the liquid electrolyte.

SUMMARY

In a broad aspect, one example embodiment provides a PAN-based gel electrolyte having improved conductivity. Another example embodiment provides a PAN-based gel electrolyte having high mechanical strength. An additional example embodiment provides a PAN-based gel electrolyte having high solvent retention.

Thus, one aspect the example embodiments provide a gel electrolyte comprising:
    a polymer in about 18 to about 22 wt %;
    a lithium salt in about 6 to about 8 wt %; and
    a solvent comprising a carbonate solvent, a lactone solvent, or a mixture thereof;
    wherein the polymer includes polyacrylonitrile (PAN) and polyethylene oxide (PEO) in a weight ratio of PAN to PEO of about 6:1 to 1:2.

In another aspect the example embodiments provide a gel electrolyte comprising:
    about 18 to about 22 wt % polyacrylonitrile (PAN);
    a lithium salt in about 6 to about 8 wt %; and
    a solvent comprising a carbonate solvent, a lactone solvent, or a mixture thereof.

Another aspect of the example embodiments provide a battery comprising any gel electrolyte of the embodiments.

Another aspect of the embodiments provides a method for preparing any gel electrolyte of the embodiments.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURE

FIG. 1 shows pore-free morphology of PAN-PEO-EC-γBL based gel electrolyte.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and are made part of this disclosure.

The decrease in ionic conductivity of PAN gel electrolyte is attributed to hindering of the lithium ions, which strongly bond to PAN. Polyethylene oxide (PEO) does not bond as strongly with lithium ions as PAN. PEO is also known for low solubility of salt in the amorphous phase. PEO completely dissolves in carbonate solvents rather than swell. This dissolution of PEO in carbonate solvents has prevented its application in gel electrolytes. While not intending to be bound by any theory, here, the partial replacement of PAN by PEO is believed to reduce the number of lithium ion coordinating sites and, consequently, increase the mobility of the lithium ion in the gel electrolyte.

In one aspect, the disclosure provides a gel electrolyte including:
 a polymer in about 18 to about 22 wt %;
 a lithium salt in about 6 to about 8 wt %; and
 a solvent including a carbonate solvent, a lactone solvent, or a mixture thereof;
 wherein the polymer includes polyacrylonitrile (PAN) and polyethylene oxide (PEO). In an illustrative embodiment, polyacrylonitrile (PAN) and polyethylene oxide (PEO) are in a weight ratio of PAN to PEO of about 6:1 to about 1:2.

Polyacrylonitrile selected from a wide range of molecular weights may be used in the methods of the example embodiments. Unless otherwise defined, polymer molecular weights noted herein are weight-averaged molecular weights ($M_W$). PANs having molecular weights from about 5,000 g/mol to about 1000,000 g/mol may be useful in these embodiments. Some PANs may have molecular weights from about 50,000 to about 300,000 g/mol. Other PANs may have molecular weights from about 50,000 to about 250,000 g/mol. In some embodiments, the molecular weight of PANs is from about 100,000 to about 200,000 g/mol. In still other embodiments, the molecular weight of the PAN is from about 100,000 to 1000,000 g/mol. In still other embodiments, the molecular weight of the PAN is about 150,000 g/mol. Mixtures of PANs with different molecular weights can also be used.

Polyethylene oxide selected from a wide range of molecular weights may be used in the methods of the embodiments. Unless otherwise defined, polymer molecular weights noted herein are weight-averaged molecular weights ($M_W$). Particular PEOs useful in the embodiments are those having molecular weights of from about 5,000 to about 800,000 g/mol. Some particular PEOs have molecular weights from about 50,000 to about 500,000 g/mol. Other particular PEOs have molecular weights from about 100,000 to about 400,000 g/mol. In one embodiment, the molecular weight of the PEO is from about 200,000 g/mol to about 350,000 g/mol. In still other embodiments, the molecular weight of the PEO is from about 200,000 to 800,000 g/mol. In still other embodiments, the molecular weight of the PEO is about 300,000 g/mol. Mixtures of PEOs with different molecular weights can also be used.

In another illustrative embodiment, the disclosure provides a gel electrolyte as described above wherein the polymer is about 12 to about 24 wt %, and the polymer includes polyacrylonitrile (PAN) and polyethylene oxide (PEO). In yet another embodiment, a gel electrolyte comprises a polymer of about 21 wt %.

In an example embodiment, the disclosure provides a gel electrolyte as described above wherein the polymer includes polyacrylonitrile (PAN) and polyethylene oxide (PEO) in a weight ratio of PAN to PEO of about 6:1 to 3:4. In another embodiment, a gel electrolyte includes PAN and PEO in a weight ratio of about 6:1, or 5:1; or 4:1; or 3:1; or 5:2; or 2:1; or 4:3. In another embodiment, a gel electrolyte includes PAN and PEO in a weight ratio of about 6:1, 5:2, or 4:3. In yet another embodiment, the weight ratio of PAN to PEO is about 5:2 (2.5:1).

In another embodiment, the disclosure provides a gel electrolyte as described above wherein the polymer consists includes polyacrylonitrile (PAN) and polyethylene oxide (PEO) in a weight ratio of PAN to PEO of about 3:4.

In another embodiment, the disclosure provides a gel electrolyte as described above wherein the polymer includes polyacrylonitrile (PAN).

Various lithium salts may be used in the methods of the example embodiment. For example, lithium salts include, but are not limited to lithium halides, lithium-metal salts, and other lithium compounds. Lithium halides include lithium bromide, lithium chloride, and lithium iodide. Lithium-metal salts include, but are not limited to lithium hexafluoroarsenate (V), and lithium hexafluorophosphate. Other lithium compounds include, but are not limited to bis(trifluoromethane) sulfonimide lithium salt, lithium borohydride, lithium dihydrogenphosphate, lithium tetrafluoroborate, lithium metaborate, lithium perchlorate, lithium thiophenolate, and lithium trifluoromethanesulfonate.

In one embodiment, the disclosure provides gel electrolyte as described above, wherein the lithium salt may include one or more of lithium perchlorate, lithium trifluoromethanesulfonate, lithium hexafluorophosphate, lithium tetrafluoroborate.

In another illustrative embodiment, the disclosure provides gel electrolyte as described above, wherein the lithium salt is lithium perchlorate.

The disclosure also provides gel electrolyte as described above, wherein the lithium salt is present in about 6.3 to about 7.5 wt %. In some embodiments, the lithium salt is present in about 6.5 to about 7.0 wt %. In other embodiments, lithium salt is present in about 7.0 to about 7.5 wt In an example embodiment, the disclosure provides a gel electrolyte as described above wherein the solvent is the carbonate solvent. The carbonate solvent includes, but is not limited to, dimethyl carbonate, diethyl carbonate, propylene carbonate, ethylene carbonate, vinylene carbonate, methyl ethyl carbonate, dipropyl carbonate, butylene carbonate, dibutyl carbonate and mixtures thereof.

In one example embodiment, the disclosure provides gel electrolyte as described above, wherein the solvent is propylene carbonate, ethylene carbonate, or a mixture thereof. In an example embodiment, the solvent is propylene carbonate. In another embodiment, the solvent is ethylene carbonate. In yet another embodiment, the disclosure provides gel electrolyte as described above, wherein the solvent is a mixture of propylene carbonate and ethylene carbonate in a 1:10; or 1:9; or 1:8; or 1:7; or 1:6; or 1:5; or 1:4; or 1:3; or 1:2; or 1:1: or 2:1; or 3:1; or 4:1; or 5:1; or 6:1; or 7:1; or 8:1; or 9:1 or 10:1 molar ratio. In yet another embodiment, the disclosure provides gel electrolyte as described above, wherein the solvent is a mixture of propylene carbonate and ethylene carbonate in a 1:1 molar ratio.

In an example embodiment, the disclosure provides a gel electrolyte as described above wherein the solvent is the lactone solvent. The lactone solvent includes, but is not limited to β-propiolactone, γ-butyrolactone, α-methyl-γ-butyrolactone, γ-crotonolactone, δ-valerolactone, γ-valerolactone, γ-caprolactone, ε-caprolactone, ethylated γ-butyrolactone, propylated γ-butyrolactone and mixtures thereof.

In one embodiment, the disclosure provides gel electrolyte as described above, wherein the solvent is γ-butyrolactone.

In another embodiment, the disclosure provides gel electrolyte as described above, wherein the solvent is a mixture of the carbonate solvent and the lactone solvent. In an example embodiment, the solvent is a mixture of propylene carbonate or ethylene carbonate, and γ-butyrolactone. In another embodiment, the Solvent is a mixture of the carbonate solvent and the lactone solvent is in a 1:1 molar ratio.

In yet another embodiment, the disclosure provides gel electrolyte as described above, wherein the solvent is a mixture of propylene carbonate and γ-butyrolactone in a 1:1 molar ratio.

In another embodiment, the disclosure provides gel electrolyte as described above, wherein the solvent is a mixture of ethylene carbonate and γ-butyrolactone in a 1:1 molar ratio.

The disclosure provides gel electrolyte as described above comprising:
polyacrylonitrile (PAN) in about 15 wt %;
polyethylene oxide (PEO) in about 6 wt %;
a lithium salt in about 6 to about 8 wt. %; and
a solvent comprising a carbonate solvent, a lactone solvent, or a mixture thereof.

The disclosure also provides gel electrolyte as described above comprising:
polyacrylonitrile (PAN) in about 15 wt %;
polyethylene oxide (PEO) in about 6 wt %;
lithium perchlorate in about 6 to about 8 wt. %; and
a solvent comprising a mixture of propylene carbonate and ethylene carbonate in a 1:1 molar ratio.

In another aspect the embodiments provide a gel electrolyte comprising:
about 18 to about 22 wt % polyacrylonitrile (PAN);
a lithium salt in about 6 to about 8 wt. %; and
a solvent comprising a carbonate solvent, a lactone solvent, or a mixture thereof.

In this aspect, PAN, lithium salt, and solvent contents may be selected as described above for the preceding aspect of the embodiments.

In a particular aspect the embodiments provide a gel electrolyte comprising:
about 21 wt % polyacrylonitrile (PAN);
a lithium salt in about 6 to about 8 wt. %; and
a solvent comprising a carbonate solvent, a lactone solvent, or a mixture thereof.

The gel electrolytes of the disclosure can be used in a variety of applications, such as batteries, electrochemical capacitors, and electrochromic displays. Examples of electrochromic display devices or applications for which gel electrolytes can be particularly suitable include, but are not limited to helmets, mirrors, optical shutters, windows, glasses, goggles, color changeable eyewear, automotive windows, aircraft windows, welding visors or other devices that can change optical or electromagnetic transmission as a result of an applied potential. Additional examples include readable displays and super/ultra capacitors for power storage.

The disclosure also provides method for preparing the gel electrolyte as described above. In a particular embodiment, the disclosure provides a method for preparing the gel electrolyte as described above, the method including:
(a) adding a lithium salt to a solvent including a carbonate solvent, a lactone solvent, or a mixture thereof to form a liquid electrolyte; and
(b) adding a polymer to the liquid electrolyte.

In one embodiment, the disclosure provides a method for preparing the gel electrolyte as described above, the method including
(a) adding a lithium salt to a solvent including a carbonate solvent, a lactone solvent, or a mixture thereof to form a liquid electrolyte;
(b) heating the liquid electrolyte; and
(c) adding a polymer to the liquid electrolyte.

EXAMPLES

The preparation of the gel electrolytes of the disclosure is illustrated further by the following examples, which are not to be construed as limiting in scope or spirit to the specific procedures and gel electrolytes described in them.

General Procedure

Poly(acrylonitrile) (PAN) was purchased from Sigma-Aldrich, USA, and has the average molecular weight of 150,000. Polyethylene oxide (PEO) was purchased from Sigma-Aldrich, USA, and has the average molecular weight of 300,000. The gel electrolytes were prepared by a solution casting technique. Conductivity was measured at room temperature using Novocontrol Alpha-N analyzer.

Example 1

PAN-PC Based Gel Electrolyte

Propylene carbonate (PC) (7.27 g) and lithium perchlorate ($LiClO_4$) (0.63 g) were mixed in a molar ratio of 12:1. The liquid electrolyte was heated to 160° C. (the decomposition temperature of PC is 170° C.), and PAN (2.1 g) was introduced. The solution was continuously stirred until clear, and a homogenous mixture was observed. At this stage, the solution turned transparent and pale yellow in color. The solution was transferred to a Teflon plate at room temperature, and the solution gelled immediately. The gel electrolytes thus obtained were kept in an oven at 50° C. for 12 hours to remove the excess solvent The content of PAN matrix in the gel electrolyte was 21 wt %. Preliminary experiments showed that above this concentration, PAN was not dissolved completely. The overall weight loss of the solvent was less than 3%. Conductivity was measured at room temperature, and shown in Table 1. The weight percentages shown in Table 1 are prior to drying.

Example 2

PAN-γBL Based Gel Electrolyte

PAN and γ-butyrolactone (γBL) based gel electrolyte may be prepared as described above. γBL and $LiClO_4$ were mixed in a molar ratio of 12:1, and the liquid electrolyte was heated up to 140° C. followed by the addition of PAN. Conductivity was measured at room temperature, and shown in Table 1.

Example 3

PAN-PC-γBL Based Gel Electrolyte

Propylene carbonate (PC) and γ-Butyrolactone (γBL) were mixed in a molar ratio of 1:1. PAN based gel electrolyte may be prepared as described above. Conductivity was measured at room temperature, and shown in Table 1.

Example 4

PAN-PC-EC Based Gel Electrolyte

Propylene carbonate (PC) and ethylene carbonate (EC) were mixed in a molar ratio of 1:1, PAN based gel electrolyte may be prepared as described above. Conductivity was measured at room temperature, and shown in Table 1.

Example 5

PAN-EC-γBL Based Gel Electrolyte

Ethylene carbonate (EC) and γ-Butyrolactone (γBL) were mixed in a molar ratio of 1:1. PAN based gel electrolyte may be prepared as described above. Conductivity was measured at room temperature, and shown in Table 1.

Example 6

PAN-PEO Based Gel Electrolytes

The preparations of PAN-PEO gel electrolytes with different solvents are similar to that of PAN based gel electrolytes. Solvent and $LiClO_4$ were mixed and heated up to 120° C. To this mixture, polyethylene oxide (PEO) was added and let to completely dissolve at 120° C. Following dissolution of PEO, PAN was introduced. The solution was continuously stirred until a clear and homogenous mixture was observed. At this stage, the solution turned transparent and pale yellow in color. The solution was transferred to a Teflon plate at room temperature, where the solution gelled immediately. The gel electrolytes thus obtained were kept in an oven at 50° C. for 12 hours to remove the excess solvent.

The composition of PAN-PEO gel electrolytes was chosen in such a way that PEO partly replaces the PAN matrix. The higher content of PEO in the composition was restricted to 12 wt % (see Table 2), above which the gel begins to lose its free standing ability. Conductivity was measured at room temperature, and shown in Table 2. The weight percentages shown in Table 2 are prior to drying.

TABLE 2

| | polymer | | solvent | | $LiClO_4$ | $\sigma_{DC}$ at RT |
| | PAN | PEO | | | | |
| Code | content (wt %) | content (wt %) | (molar ratio) | content (wt %) | content (wt %) | (S/cm) (×10⁻³) |
|---|---|---|---|---|---|---|
| PAN18_PEO_PC | 18 | 3 | PC | 72.70 | 6.30 | 4.98 |
| PAN15_PEO_PC | 15 | 6 | | 72.70 | 6.30 | 7.17 |
| PAN12_PEO_PC | 12 | 9 | | 72.70 | 6.30 | 5.31 |
| PAN9_PEO_PC | 9 | 12 | | 72.70 | 6.30 | 2.13 |
| PAN18_PEO_γBL | 18 | 3 | γBL | 71.64 | 7.36 | 5.87 |
| PAN15_PEO_γBL | 15 | 6 | | 71.64 | 7.36 | 6.13 |
| PAN12_PEO_γBL | 12 | 9 | | 71.64 | 7.36 | 5.12 |
| PAN9_PEO_γBL | 9 | 12 | | 71.64 | 7.36 | 1.98 |
| PAN18_PEO_PC_γBL | 18 | 3 | PC:γBL (1:1) | 72.21 | 6.79 | 6.30 |
| PAN15_PEO_PC_γBL | 15 | 6 | | 72.21 | 6.79 | 6.90 |
| PAN12_PEO_PC_γBL | 12 | 9 | | 72.21 | 6.79 | 6.08 |
| PAN9_PEO_PC_γBL | 9 | 12 | | 72.21 | 6.79 | 3.92 |
| PAN18_PEO_PC_EC | 18 | 3 | PC:EC (1:1) | 72.15 | 6.85 | 8.32 |
| PAN15_PEO_PC_EC | 15 | 6 | | 72.15 | 6.85 | 10.11 |
| PAN12_PEO_PC_EC | 12 | 9 | | 72.15 | 6.85 | 6.11 |
| PAN9_PEO_PC_EC | 9 | 12 | | 72.15 | 6.85 | 3.52 |
| PAN18_PEO_EC_γBL | 18 | 3 | EC:γBL (1:1) | 71.56 | 7.44 | 5.32 |
| PAN15_PEO_EC_γBL | 15 | 6 | | 71.56 | 7.44 | 5.29 |
| PAN12_PEO_EC_γBL | 12 | 9 | | 71.56 | 7.44 | 4.50 |
| PAN9_PEO_EC_γBL | 9 | 12 | | 71.56 | 7.44 | 2.52 |

TABLE 1

| | polymer | | solvent | | $LiClO_4$ | $\sigma_{DC}$ at RT |
| Code | (molar ratio) | content (wt %) | (molar ratio) | content (wt %) | content (wt %) | (S/cm) (×10⁻³) |
|---|---|---|---|---|---|---|
| PAN21_PC | PAN | 21.00 | PC | 72.70 | 6.30 | 3.44 |
| PAN21_γBL | | | γBL | 71.64 | 7.36 | 4.37 |
| PAN21_PC_γBL | | | PC:γBL (1:1) | 72.21 | 6.79 | 3.98 |
| PAN21_PC_EC | | | PC:EC (1:1) | 72.15 | 6.85 | 5.32 |
| PAN21_EC_γBL | | | EC:γBL (1:1) | 71.56 | 7.44 | 5.28 |

Results

Without being limited to any one theory of operation, the lithium ion coordinating sites in polyacrylonitrile (PAN) are believed to be reduced by blending with polyethylene oxide (PEO), thereby increasing the conductance of the final gel. Table 3 shows the Differential scanning calorimetry (DSC) data including glass transition temperature ($T_g$), melting point ($T_m$) and change in enthalpy ($\Delta H$) of PAN gel, PAN-PEO and corresponding solvent and liquid electrolytes. DSC studies indicated little or no crystallization (calculated from $\Delta H$) of PEO in PAN-PEO based gel electrolytes. FIG. 1 shows the morphology of PAN-PEO based gel electrolyte. The morphology of PAN-PEO gel electrolyte indicated that the structure is not only substantially homogenous, but also substantially free from pores. The lack of pores makes it difficult for the solvent to exude from the gel electrolyte. The solvent retention of PAN-PEO based gel electrolyte is comparable to that of PAN based gel electrolyte.

TABLE 3

| Code | $T_g$ (°C.) | $T_1^{Exo}$ (°C.) | $T_1^{Endo}$ (°C.) | $T_2^{Endo}$ (°C.) | $\Delta H_1^{Exo}$ (J/g) | $\Delta H_1^{Endo}$ (J/g) | $\Delta H_2^{Endo}$ (J/g) |
|---|---|---|---|---|---|---|---|
| PC | −113 | — | — | — | — | — | — |
| PC_LiClO$_4$ | −105 | — | — | — | — | — | — |
| PAN21_PC | −110 | — | — | — | — | — | — |
| 15PAN_6PEO_PC | −105 | — | — | — | — | — | — |
| γBL | — | — | −40 | — | — | −37 | — |
| γBL_LiClO$_4$ | −127 | −85 | −53 | — | +21 | −21 | — |
| PAN21_γBL | −123 | 110 | 172 | — | +2 | −2 | — |
| 15PAN_6PEO_γBL | −111 | — | — | — | — | — | — |
| PC_γBL | −127 | −90 | −67 | — | +2 | −2 | — |
| PC_γBL_LiClO$_4$ | −109 | — | — | — | — | — | — |
| PAN_21_PC_γBL | −113 | −82 | −67 | — | +2 | −2 | — |
| 15PAN_6PEO_PC_γBL | −105 | — | — | — | — | — | — |
| EC | — | — | +38 | — | — | −24 | — |
| PC_EC | −110 | −58 | +2 | — | +13 | −13 | — |
| PC_EC_LiClO$_4$ | −101 | — | — | — | — | — | — |
| PAN21_PC_EC | −104 | −58 | −45 | — | +2 | −2 | — |
| 15PAN_6PEO_PC_EC | −98 | — | — | — | — | — | — |
| EC_γBL | — | — | −46 | 0 | — | −23 | −6 |
| EC_γBL_LiClO$_4$ | −114 | −50 | −2 | — | +14 | −14 | — |
| PAN_21_EC_γBL | −103 | −57 | −1 | — | +7 | −7 | — |
| 15PAN_6PEO_EC_γBL | −97 | −40 | 7 | +12 | −12 | — | — |

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A gel electrolyte comprising:
polyacrylonitrile (PAN) in about 15 wt %;
polyethylene oxide (PEO) in about 6 wt %;
a lithium salt in about 6.3 to about 7.5 wt %, wherein the lithium salt consists of lithium perchlorate; and
a solvent comprising a mixture of propylene carbonate and γ-butyrolactone in a 1:1 molar ratio.

* * * * *

UNITED STATES PATENT AND TRADEMARK OFFICE
CERTIFICATE OF CORRECTION

PATENT NO. : 8,871,390 B2
APPLICATION NO. : 13/139114
DATED : October 28, 2014
INVENTOR(S) : Balaji et al.

It is certified that error appears in the above-identified patent and that said Letters Patent is hereby corrected as shown below:

On the Title Page, Item (56), under "OTHER PUBLICATIONS", in Column 2, Line 33, delete "Hayamzu," and insert -- Hayamizu, --, therefor.

On the Title Page, Item (56), under "OTHER PUBLICATIONS", in Column 2, Lines 34-35, delete "coss-linked PEO, γ-butyrolacone" and insert -- cross-linked PEO, γ-butyrolactone --, therefor.

On Title Page 2, Item (56), under "OTHER PUBLICATIONS", in Column 2, Line 3, delete "flouride),"" and insert -- fluoride)," --, therefor.

In the Specification,

In Column 1, Line 13, delete "U.S.C. 371" and insert -- U.S.C. §371 --, therefor.

In Column 4, Line 37, delete "7.5 wt" and insert -- 7.5 wt%. --, therefor.

In Column 5, Line 6, delete "the Solvent" and insert -- the solvent --, therefor.

In Column 5, Line 67, delete "including" and insert -- including: --, therefor.

In Column 6, Line 40, delete "solvent" and insert -- solvent. --, therefor.

In Column 7, Line 7, delete "1:1," and insert -- 1:1. --, therefor.

Signed and Sealed this
Thirty-first Day of March, 2015

Michelle K. Lee
*Director of the United States Patent and Trademark Office*